United States Patent
Avganim

(10) Patent No.: US 10,398,045 B2
(45) Date of Patent: Aug. 27, 2019

(54) PCB MOUNTED SECURITY SLOT

(71) Applicant: Meir Avganim, Gealya (IL)

(72) Inventor: Meir Avganim, Gealya (IL)

( * ) Notice: Subject to any disclaimer, the term of this patent is extended or adjusted under 35 U.S.C. 154(b) by 420 days.

(21) Appl. No.: 14/849,803

(22) Filed: Sep. 10, 2015

(65) Prior Publication Data

US 2016/0081212 A1    Mar. 17, 2016

Related U.S. Application Data

(60) Provisional application No. 62/049,414, filed on Sep. 12, 2014.

(51) Int. Cl.
| | |
|---|---|
| *H05K 5/02* | (2006.01) |
| *E05B 45/00* | (2006.01) |
| *E05B 39/00* | (2006.01) |
| *E05B 41/00* | (2006.01) |
| *E05B 73/00* | (2006.01) |
| *G06F 1/16* | (2006.01) |
| *G06F 21/88* | (2013.01) |

(52) U.S. Cl.
CPC .......... *H05K 5/0221* (2013.01); *E05B 39/00* (2013.01); *E05B 41/00* (2013.01); *E05B 45/005* (2013.01); *E05B 73/0005* (2013.01); *E05B 73/0082* (2013.01); *G06F 1/1613* (2013.01); *G06F 1/1616* (2013.01); *G06F 1/1656* (2013.01); *G06F 21/88* (2013.01); *H05K 5/0208* (2013.01)

(58) Field of Classification Search
CPC . E05B 73/0082; E05B 45/005; H05K 5/0208; H05K 5/0221

USPC ............. 361/679.57; 70/58, 439; 340/568.1, 340/568.2
See application file for complete search history.

(56) References Cited

U.S. PATENT DOCUMENTS

| | | | |
|---|---|---|---|
| 5,059,948 A | 10/1991 | Desmeules | |
| 5,452,983 A | 9/1995 | Parmley, Sr. | |
| 6,265,091 B1 | 7/2001 | Pierson et al. | |
| 6,389,853 B1* | 5/2002 | Pate | E05B 45/005 340/432 |
| 6,459,374 B1 | 10/2002 | Rand et al. | |
| 8,230,707 B2* | 7/2012 | Hung | E05B 73/0082 248/551 |

(Continued)

FOREIGN PATENT DOCUMENTS

| | | |
|---|---|---|
| CN | 2180736 Y | 10/1994 |
| CN | 201274049 Y | 7/2009 |

(Continued)

OTHER PUBLICATIONS

International Search Report dated Jan. 18, 2016 issued in connection with corresponding PCT/IB2015/001949.

(Continued)

*Primary Examiner* — Nidhi Thaker
(74) *Attorney, Agent, or Firm* — Ostrolenk Faber LLP

(57) ABSTRACT

A portable communication or computing device with security against theft, includes a PC mounted security slot which is accessible through an outer wall via an access opening therein. The security slot is defined in a rigid material which is either soldered with pins or connected with screws to a printed circuit board or the like inside the portable device. The security system includes a detector for detecting any instance of the cable of the lock associated with the security slot having been cut.

15 Claims, 6 Drawing Sheets

(56) References Cited

U.S. PATENT DOCUMENTS

| | | | |
|---|---|---|---|
| 8,842,422 B2* | 9/2014 | Hung | E05B 73/0005 |
| | | | 361/679.01 |
| 9,152,826 B2* | 10/2015 | Zhang | G06F 21/88 |
| 9,624,697 B1* | 4/2017 | Avganim | G06F 1/1656 |
| 2002/0003052 A1 | 1/2002 | Hayashi | |
| 2004/0074264 A1 | 4/2004 | Kung et al. | |
| 2006/0036781 A1 | 2/2006 | Thacker | |
| 2007/0192640 A1 | 8/2007 | Fukuchi | |
| 2009/0158423 A1 | 6/2009 | Orlassino et al. | |
| 2010/0136425 A1 | 6/2010 | Gau et al. | |
| 2010/0147041 A1* | 6/2010 | Teicher | E05B 73/0005 |
| | | | 70/58 |
| 2010/0251391 A1 | 9/2010 | Adrangi | |
| 2011/0187532 A1 | 8/2011 | Edelstein et al. | |
| 2014/0326027 A1 | 11/2014 | Avganim | |

FOREIGN PATENT DOCUMENTS

| | | |
|---|---|---|
| CN | 201433622 Y | 3/2010 |
| CN | 201810076 U | 4/2011 |
| CN | 202736209 U | 2/2013 |
| CN | 203321130 U | 12/2013 |
| DE | 10 2006 032 733 | 1/2008 |
| EP | 0 747 555 A1 | 12/1996 |

OTHER PUBLICATIONS

Notification Concerning Transmittal of International Preliminary Report on Patentability, dated May 12, 2016 with accompanying Written Opinion of the International Searching Authority.

* cited by examiner

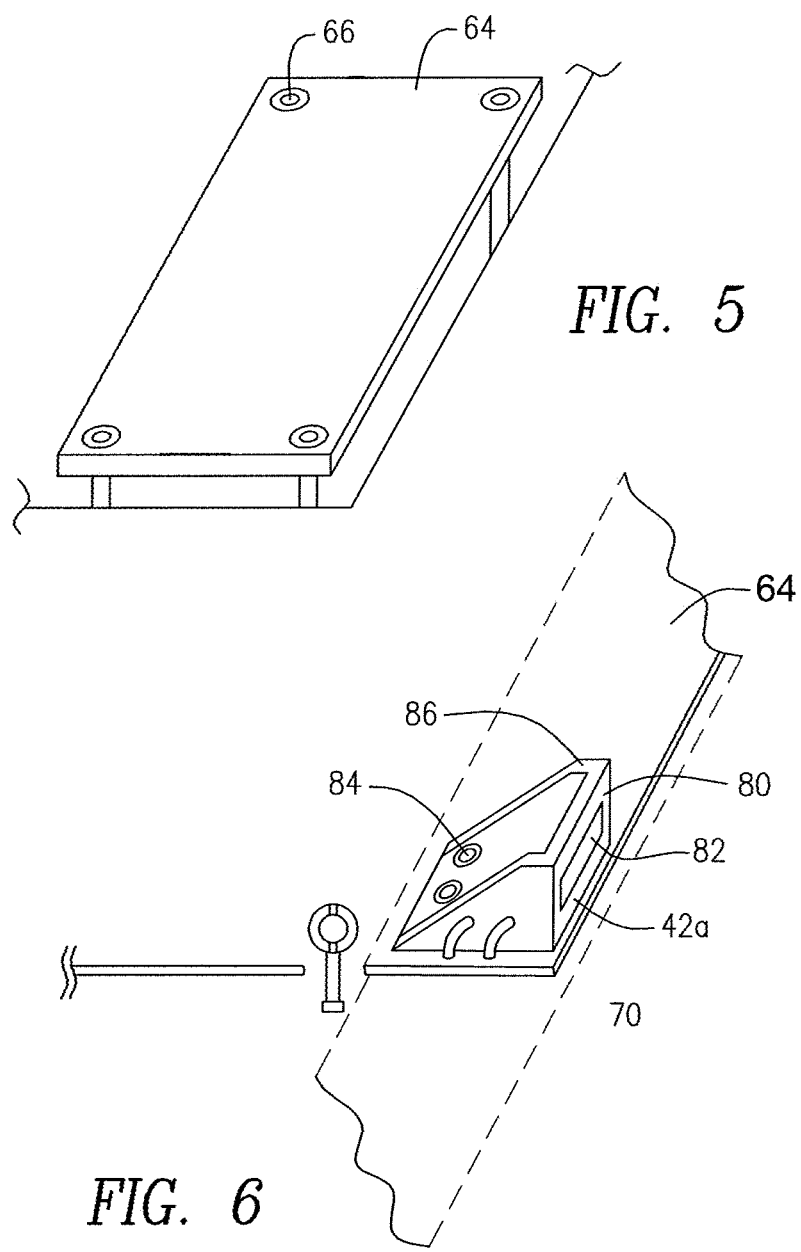
FIG. 5
FIG. 6
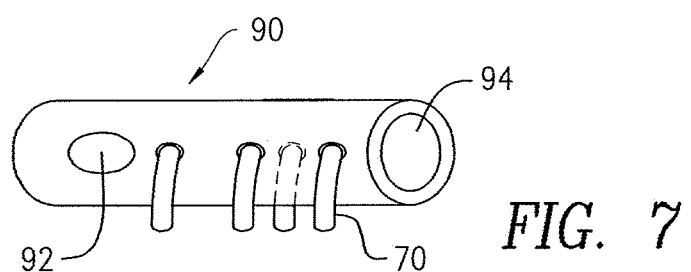
FIG. 7

PCB MOUNTED SECURITY SLOT

CROSS-REFERENCE TO RELATED APPLICATION

The present application claims benefit of and priority to U.S. Provisional Application Ser. No. 62/049,414 filed Sep. 12, 2014 entitled PCB MOUNTED SECURITY SLOT, the contents of which are incorporated herein by reference.

BACKGROUND OF THE INVENTION

The present invention relates to devices for hindering the theft of relatively small, but expensive pieces of equipment.

Computers have evolved from large, expensive machines used only by a few, to relatively small, portable, handheld machines which are usable by many. Nowadays, more and more of the computers and portable devices are in the form of laptops, tablets, mobile telephones and the like, all of which pack significant processing power and are capable of performing tasks and store information which, decades ago, required a roomful of computers. At the same time, these highly portable electronic devices carry a steep price tag, on the order of several hundreds of dollars for a device such as the Apple iPhone™ smartphone and similar devices.

A variety of devices have been developed to inhibit the theft of these portable devices and the common expedient has been to provide these devices with a security slot through which a locking element of a lock can be passed and which lock is also provided with a long cable of a few feet that has a loop at the end and which enables the highly portable mobile devices to be tethered to an immovable object.

The art of computer security has improved tremendously over the years and a large body of prior art documents including issued patents have become available. Representative prior art includes U.S. Pat. Nos. 8,820,127; 8,739,583; 8,307,675; 7,562,547; 7,549,308; 7,441,426; 7,249,474; 7,201,029; 7,028,513; and 6,244,082. The entire contents of the aforementioned list of patents are incorporated by reference herein.

The instant inventor has come to the realization that further improvements can be obtained to solve a remaining, vexing, unsolved problem. The sizes of computing have become ever smaller. Mobile phones are on the order of about 10 millimeters thick and just a few centimeters in width and length. Consequently, the locks have become smaller and the cables by which these devices are tethered to immovable objects have become thinner. The ever continuing quest to reduce the sizes has also resulted the walls of these portable devices becoming quite thin. Therefore, the security slots which are defined in very thin walls, often made of plastic, have been weakened and this has enabled removing the lock with a strong hand pull or by twisting it, breaking the outer wall of the computing device without undermining its functionality.

SUMMARY OF THE INVENTION

It is an object of the present invention to provide improved security devices, systems and methods for mobile devices.

It is a further of object of the invention to provide a locking system for highly mobile and extremely compact communication and computing devices that provide protection against the cable of the lock being cut.

It is yet another object of the invention to provide security slots in computing devices that provide very strong and sturdy and not easily broken security slot.

The foregoing and other objects of the invention are realized by a portable electronic device with a locking system, comprising: a printed circuit board securely anchored to a housing of said electronic device; a security locking component in the form of a lock opening defined in a material slab, said lock opening being configured to receive a locking head of a lock system; and wherein said locking component is physically anchored to the printed circuit board in the housing of the electronic device.

The housing may comprise an access opening that is registered with the lock opening, so as to enable passage of the locking head to the lock opening. The material slab may be in the shape of a metal flange in which said lock opening is defined. The lock opening may be formed as a cavity in said material slab. The cavity may be a dead ended cavity. The cavity may be trapezoid shaped within. The lock opening may be formed as a through going opening is said material slab. The lock opening may be rectangular and measures about 3×7 mm in width and length, respectively.

The material slab may be configured to damage said printed circuit board when a pulling force of greater than a predetermined value is exerted on said locking head. The portable electronic device may include at least one electrical node on the printed circuit board which is electrically coupled to and associated with said lock system. The lock system may include a lock cable with an electrical wire extending in said cable and the electrical node is electrically coupled to the electrical wire in a manner that enables circuitry located on said printed circuit board to determine whether said electrical wire has been severed based on a state of an electrical property at said electrical mode.

The electronic device may be one of a mobile smart phone, a laptop computer, a desktop computer and a tablet computer. The electrical wire preferably forms a continuous closed circuit when the locking head is in a locking position within the lock opening, and the electrical property at the electrical node is configured such that unauthorized disruption of the closed circuit effects at least one of triggering of an alarm and disabling of the electronic device. An application program (AP) may be installed in the electronic device that runs in a background mode, wherein upon insertion of the locking head in the lock opening a request is presented to the user on a screen of the electronic device to enter a password that the computer device is to be operationally locked, whereby with such locking initiation cutting of the cable is immediately detected by the AP and a prompt appears on the screen that a password be entered to enable continued operation of the electronic device and if such password is not entered the electronic device remains inoperable. AP allows the otherwise inoperable electronic device to connect to a central controlling server, to prove ownership of the electronic device, with proper ownership being shown enabling the electronic device to resume its normal operation.

Other features and advantages of the present invention will become apparent from the following description of the invention which refers to the accompanying drawings.

BRIEF DESCRIPTION OF THE DRAWINGS

FIGS. 2 through FIG. 5 also show prior art computing and communication devices features.

FIG. 6 shows a security slot construction in accordance with a first embodiment of the invention.

FIG. 7 shows a security slot in accordance with another embodiment of the invention.

DETAILED DESCRIPTION OF EMBODIMENTS OF THE INVENTION

Figure 1A:
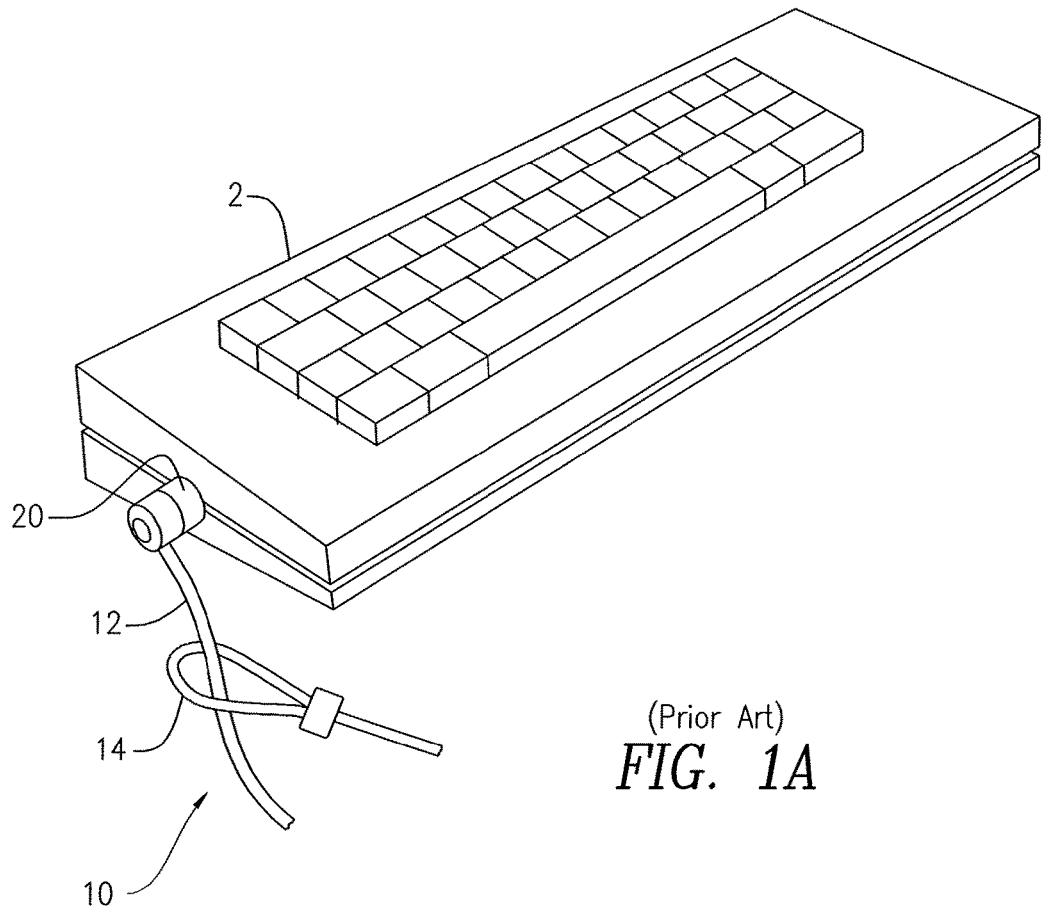
FIGS. 1A through 1E show prior art locking devices and systems.
Figure 1B:
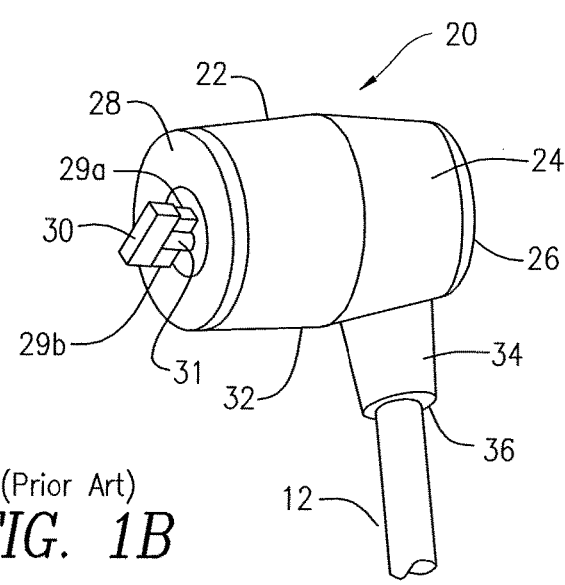

Prior art FIG. 1A depicts an electronic device, e.g., a keyboard 2, with a security slot (not shown) to which is attached a locking system 10 that includes a lock 20, a cable 12 connected to the lock 20 with the cable 12 having at the distal end a loop 14 through which the lock can be threaded. Thereby, the loop cable can be threaded through an immobile device, for example, an armrest of a chair, in well known manner. The lock 20 is cylindrically shaped and has a forward body part 22 and a rear body part 26 with a cover 24 that is rotatable relative to the body part 22. The cable 12 penetrates into an opening 36 of a collar 34 which rotates on the rear body part 26 in well known manner. A screw 32, or equivalent, connects the two housing parts to each other.

Figure 1D:
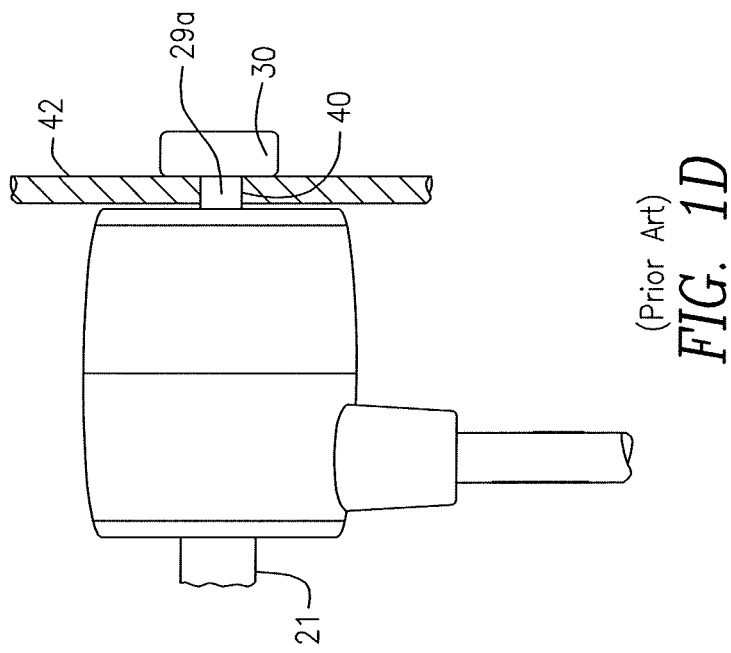
Figure 1C:
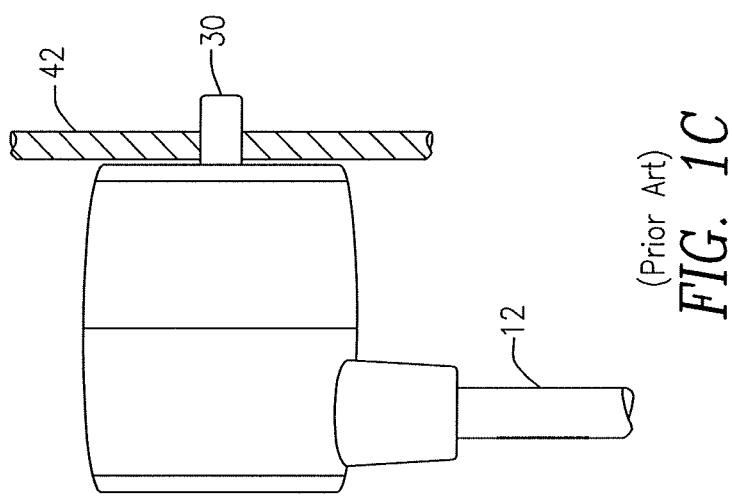
Figure 1E:
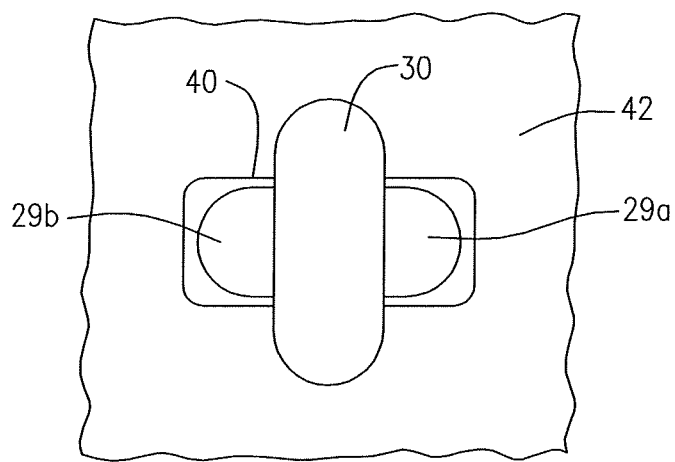

Most importantly, at the front face 28 is provided a locking element which comprises a T-bar style locking element that has a cross locking tab or head 30 attached to a shaft 31, rotatable by means of a key (to be described) and including anti-rotation pins 29a, 29b, all in well known manner. The security slot 40 (FIG. 1E) is defined in the wall 42 of the portable device and is constructed to receive the locking elements of the lock 20, including the anti-rotation pins 29a, 29b and the lock head 30 which is initially aligned with anti-rotation pins, so that it can be inserted in the slot (FIG. 1C) and thereafter rotated to the position in FIG. 1D, effecting the locking operation via a keying operation shown at 21 in FIG. 1D.

Figure 2:
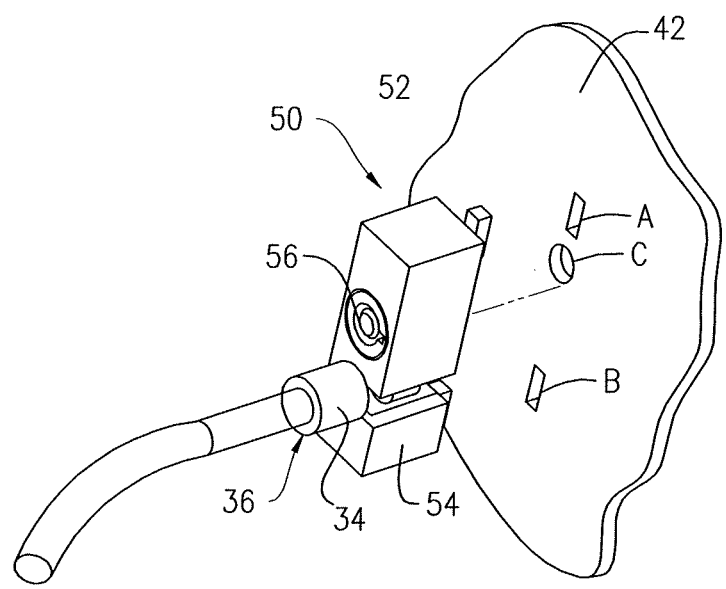

In another prior art construction (FIG. 2), the cable 12 is inserted through an opening 36 into a header 34, which is received in a slot in a lock 50, defined in the block 54 and which has pins 52, 53 which can be inserted in security slots A and B in the wall 42 of a computing or mobile device. Note the locking pin 56 which can be inserted into the hole C and which cannot be retracted, except with a key (not shown)

Figure 3:
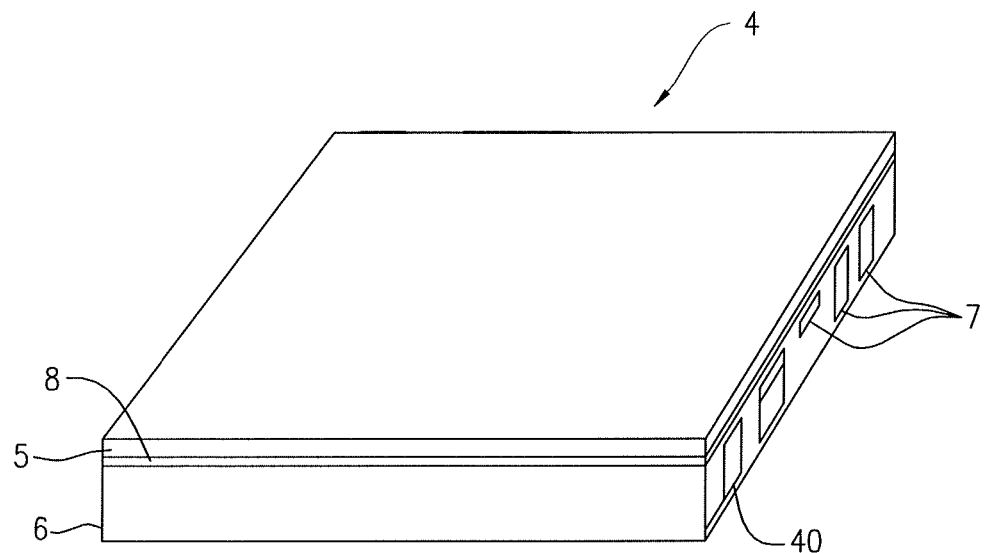
Figure 4:
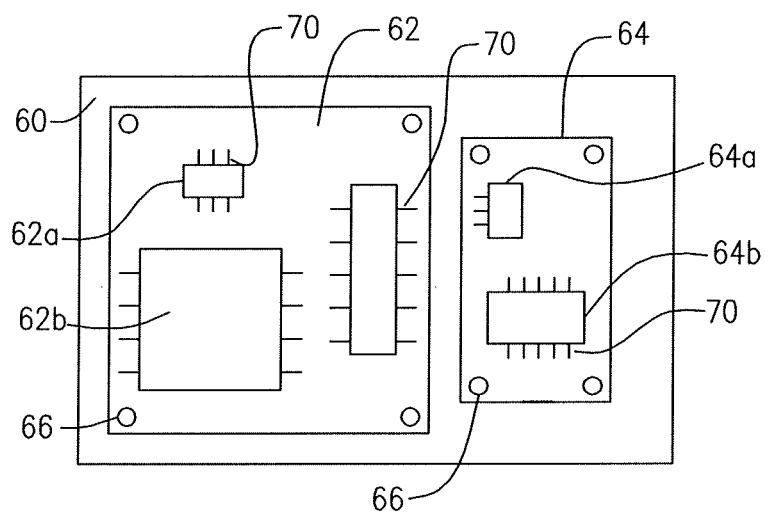

In FIG. 3, a generic mobile device 4 might consist of a single panel with the top surface being a glass cover and being used as a telephone or it might be a two-part computing device with a top 5 which is hingedly connected at 8 to a bottom 6. Regardless, a plurality of connection ports 7 may be provided. Most significantly, the security slot 40 is also shown.

Inside the computer device 4 there is typically to be found a bottom wall or base 60 on which are placed or to which are connected one or more printed circuit boards (PCBs), for example, a circuit board 62 and another circuit board 64. The circuit board 70 has a plurality of integrated circuits (ICs), for example, 62a and 62b, and the circuit board itself is connected by means of screws or other hardware 66 very firmly to the base or bottom wall below, providing a very strong, sturdy connection. Similarly, the second circuit board 64 may have integrated circuits 64a, 64b. Most significantly, these ICs are connected by pins 70 which are either soldered or otherwise very firmly attached to the circuit board. The circuit boards 62, 64 will not budge and any attempt to move them will destroy the entire device. The circuit board 64 is shown in perspective, including the connection hardware 66 in FIG. 5.

In accordance with the present invention, FIG. 6 illustrates a portion of the printed circuit board (PCB) 64 having attached thereto a rigid material slab, preferably a metal flange or partial housing with a front wall 80 made of sufficiently thick and strong material 86 that has defined therein a security slot 82 located adjacent the security slot 42a of the outer wall 42. Neither the PCB 64, nor the housing 80 will move, particularly when anchored as any circuit component with pins 70 and/or additional screws/ bolts hardware 84, as shown. When the locking head 30 is inserted through the outer wall 42 of the computing device and through the security slot 82 and anchored therein, no amount of pulling will enable withdrawal of the locking system 10 of the present invention, without causing unacceptable damage. Attempts to dislodge the locking head 30 might damage and render inoperable the entire computing device. In addition, the two pins 70 in FIG. 6 might provide a signal path which is disrupted when attempts to shake or break the housing 86 are engaged in. The front wall 80 may have a portion thereof in which the slot 82 is defined within the space of the security slot 42a.

It is not necessary to have the precise security slot shape, as in FIG. 6. As is well known in the art, some security slots are defined in a cylindrical body 90, which has locking balls 92 and which similarly can be connected by a plurality of pins to the printed circuit board 64 of FIG. 6. Thereby, a locking element may be inserted through the opening 94 and a locking operation provided thereby. As would be appreciated by persons of ordinary skill, the security slot herein can have the shape and construction of other known security slots or any security slot whatsoever. The invention is applicable to trapezoidal security slots, as in the present applicant's pending patent application, or in security slots formed of several openings, which openings can be of any geometrical shape, depth, size and construction.

Figure 8:
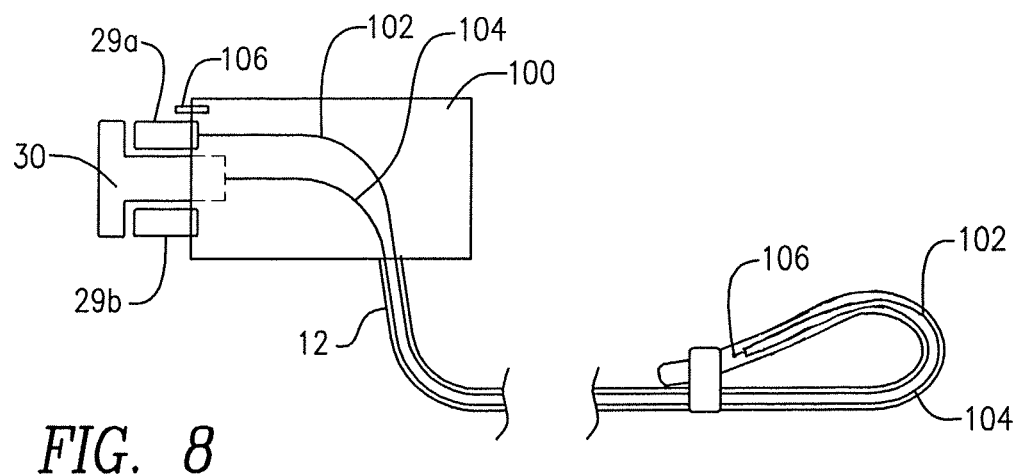
FIG. 8 shows another aspect of the present invention.

Referring to FIG. 8, a further development of the invention provides in the lock 100 that has the anti-rotation pins 29a, 29b and rotatable locking head 30, a pair of electrical conduits 102, 104, which extend from the lock 100 through the entire cable 12 to the very distal end thereof 106, where the free ends are joined to one another. At the other end, the electrical conduit 104 is connected to the shaft of the rotatable lock element 30 while the other conduit 102 is connected to the anti-rotation pin 29a or to another pin which is spring biased out of the body 100, as shown at 106.

Figure 9:
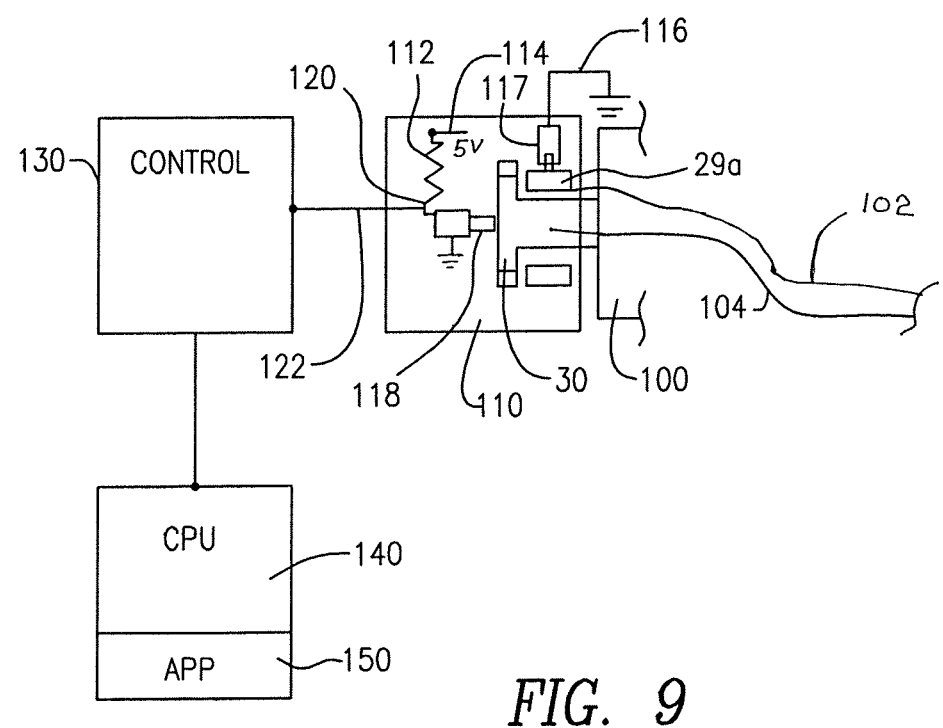
FIG. 9 shows a circuit arrangement for the embodiment of FIG. 8.

Referring to FIG. 9, the locking system also provides on the printed circuit board or within the lock housing 86/110, 5 volt source 114 which provides a 5 volt signal to resistor 112, the end of which resistor 112 is connected to a spring biased pin 118. The housing 110 also has a ground 116 connected to another component 117. When the lock 100 (of FIG. 8) is inserted through the slot, its head 30 engages the spring biased pin 118. At the same time, the conduit 102 engages the pin 29a, which, when inserted, makes an electrical contact with the ground pin 116. Effectively, the resistor node 120 becomes connected to the ground 116 when the lock is inserted, providing a signal 122 to the control 130, which provides that low ground signal to the CPU 140, which runs an AP program 150. Importantly, if someone cuts the cable or attempts to break the lock, the voltage at the outlet 122 is restored to a high signal of 5 volts, notifying the CPU that the cable has been broken.

The AP (application program) 150 is a simple program that runs in the background of the computing device which may have the following features that are easily programmable therein. When a person's computing device is on, and the AP 150 is launched, nothing will happen initially. However, when the lock 100 is inserted, the user is prompted to enter a password (or press an icon button) that the computer device is to be locked. At the same time, a software flag is set, indicating this condition. If someone cuts the cable 12, this is immediately detected by the AP and the operator is prompted to enter a password to enable continued operation at the computing device. If that person is unable to enter that code, the internal registers of the computer are reset, rendering the computer device entirely inoperable. The AP may allow the computer to connect to a central server, to prove ownership of the device, enabling one to reset the machine to allow its normal operation. Many other ways of controlling the device to prevent tampering therewith can be realized by one of ordinary skill in the art, based on the instant disclosure.

In addition to rendering the device inoperable or alternatively the AP may be configured to utilize audio elements of the computing device to trigger an alarm of timed duration which can only be shut off with the entry of a predetermined password (as used herein all passwords to provide enumerated functions are predetermined). In a further embodiment, particularly if the computing device embodies a transmitting function (e.g., a smart phone), the AP may be configured to utilize the transmitting element of the computing device to transmit a notification, ideally in real time, to the owner/user (having a separate receiver or to any other designated receiver) that the device is being compromised.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A portable electronic device with a locking system, comprising:
   an outer wall defining a housing of said portable electronic device, said outer wall including an access opening into an interior of said housing; a printed circuit board securely anchored to said housing of said portable electronic device; a security locking component in the form of a lock opening defined in a material slab, said lock opening being configured to receive a locking head of a lock system, said material slab comprising a metal flange with a front wall in which said opening is defined; and
   wherein said security locking component is physically anchored to the printed circuit board in the housing of the portable electronic device, and
   wherein said material slab is sufficiently sturdy to receive and hold said locking head of said lock system anchored to said printed circuit board via said security locking component without said access opening provided at said outer wall of said housing, and wherein said access opening is registered with and located directly adjacent to the lock opening, so as to enable passage of the locking head to the lock opening.

2. The portable electronic device of claim 1, wherein said lock opening is formed as a cavity in said material slab.

3. The portable electronic device of claim 2, wherein said cavity is a dead ended cavity.

4. The portable electronic device of claim 3, wherein said cavity is trapezoid shaped within.

5. The portable electronic device of claim 1, wherein said lock opening is formed as a through going opening is said material slab.

6. The portable electronic device of claim 5, wherein said lock opening is rectangular and measures about 3×7 mm in width and length, respectively.

7. The portable electronic device of claim 1, wherein said material slab is configured to damage said printed circuit board when a pulling force of greater than a predetermined value is exerted on said locking head.

8. The portable electronic device of claim 1, including at least one electrical node on said printed circuit board which is electrically coupled to and associated with said lock system.

9. The portable electronic device of claim 8, wherein said lock system includes a lock cable with an electrical wire extending in said cable and said electrical node is electrically coupled to said electrical wire in a manner that enables circuitry located on said printed circuit board to determine whether said electrical wire has been severed based on a state of an electrical property at said electrical mode.

10. The portable electronic device of claim 9, wherein the electrical wire forms a continuous closed circuit when the locking head is in a locking position within the lock opening, and wherein the electrical property at the electrical node is configured such that unauthorized disruption of the closed circuit effects at least one of triggering of an alarm and disabling of the portable electronic device.

11. The portable electronic device of claim 10, wherein an application program (AP) is installed in the portable electronic device which runs in a background mode, wherein upon insertion of the locking head in the lock opening a request is presented to the user on a screen of the portable electronic device to enter a password that the portable electronic device is to be operationally locked, whereby with such locking initiation cutting of the cable is immediately detected by the AP and a prompt appears on the screen that a password be entered to enable continued operation of the portable electronic device and if such password is not entered the portable electronic device remains inoperable.

12. The portable electronic device of claim 11, wherein the AP allows the otherwise inoperable portable electronic device to connect to a central controlling server, to prove ownership of the portable electronic device, with proper ownership being shown enabling the portable electronic device to resume its normal operation.

13. The portable electronic device of claim 1, wherein the portable electronic device is one of a mobile smart phone, a laptop computer, a desktop computer and a tablet computer.

14. The portable electronic device of claim 1, wherein said access opening has a shape complementary to a shape and orientation of said lock opening.

15. A portable electronic device with a locking system, comprising: a printed circuit board securely anchored to a housing of said portable electronic device; a security kicking component in the form of a lock opening defined in a material slab, said lock opening being configured to receive a locking head of a lock system; and wherein said security locking component is physically anchored to the printed circuit board in the housing of the portable electronic device, in a manner that is sufficiently sturdy to receive and hold said locking head of said lock system anchored to said printed circuit board via said security locking component, and wherein the housing comprises an access opening that is registered with and located directly adjacent to the lock opening, so as to enable passage of the locking head to the lock opening, wherein said security locking component is anchored to said printed circuit board by at least one of screws and bolts.

\* \* \* \* \*